(12) United States Patent
Chen

(10) Patent No.: US 6,351,849 B1
(45) Date of Patent: Feb. 26, 2002

(54) COMPILER OPTIMIZATION THROUGH COMBINING OF MEMORY OPERATIONS

(75) Inventor: William Y. Chen, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/316,826

(22) Filed: May 21, 1999

(51) Int. Cl.⁷ .................................................. G06F 9/45
(52) U.S. Cl. .............................................. 717/9; 717/5
(58) Field of Search ........................ 717/5, 9; 712/233, 712/230, 234, 226

(56) References Cited

U.S. PATENT DOCUMENTS

| | | | | |
|---|---|---|---|---|
| 4,642,764 A | * | 2/1987 | Auslander et al. ............. | 717/9 |
| 5,613,121 A | * | 3/1997 | Blainey .......................... | 717/9 |
| 5,778,233 A | * | 7/1998 | Besaw et al. ................... | 717/9 |
| 5,930,507 A | * | 7/1999 | Nakahira et al. .............. | 717/5 |
| 5,987,594 A | * | 11/1999 | Panwar et al. .............. | 712/216 |
| 6,016,398 A | * | 1/2000 | Radigan ......................... | 717/9 |
| 6,029,005 A | * | 2/2000 | Radigan ......................... | 717/9 |
| 6,131,156 A | * | 10/2000 | Quarnstrom et al. ........ | 712/216 |
| 6,151,705 A | * | 11/2000 | Santhanam .................... | 717/9 |

OTHER PUBLICATIONS

Huguet et al., "Architectural Support for Reduced Register Saving/Restoring in Single–Window Register Files," ACM Transactions on Computer Systems, vol. 9, No. 1, Feb. 1991, pp. 66–97.*

* cited by examiner

*Primary Examiner*—Tuan Q. Dam
(74) *Attorney, Agent, or Firm*—Schwegman, Lundberg, Woesner & Kluth, P.A.

(57) ABSTRACT

A method for compiling comprising receiving a source program having a number of memory operation blocks that are mutually exclusive. Each of the memory operation blocks have a memory operation, such that the memory operation in each block is associated with a different memory address. Additionally, an executable program is generated based on the source program. The executable program includes an executable program section for each memory operation block of the source program such that each executable program section utilizes a same number of registers for each memory operation within each memory operation block.

24 Claims, 7 Drawing Sheets

```
          IF (A==B) THEN
        ┌    {
  402   ┤        C=1;
        └    }
             ELSE
        ┌    {
  404   ┤        D=2;
        └    }
```

```
          IF (A==B) THEN
             {
  502 ─── ADDRESS REGISTER 306=ADDRESS OF "C";
  504 ─── VALUE REGISTER 308=1;
             }
             ELSE
             {
  506 ─── ADDRESS REGISTER 306=ADDRESS OF "D";
  508 ─── VALUE REGISTER 308=2;
             }
  510 ─── STORE [ADDRESS REGISTER 306]=VALUE REGISTER 308;
```

```
IF (A==B) THEN
    202 ⌇ Ra=ADDRESS OF "Z";
    204 ⌇ Rv=1;
ELSE
    206 ⌇ Ra=ADDRESS OF "Z";
    208 ⌇ Rv=2;

210 ⌇ STORE[Ra] ← Rv
```

FIG. 2
(PRIOR ART)

```
IF (A==B) THEN
    Z=1;            } 102
ELSE
    Z=2;            } 104
```

FIG. 1
(PRIOR ART)

IF (A==B) THEN
502 —↙ ADDRESS REGISTER 306=ADDRESS OF "C";
504 —↙ VALUE REGISTER 308=1;
ELSE
506 —↙ ADDRESS REGISTER 306=ADDRESS OF "D";
508 —↙ VALUE REGISTER 308=2;

510 —↙ STORE [ADDRESS REGISTER 306]=VALUE REGISTER 308;

FIG. 5

IF (A==B) THEN
~ C=1; ~  } 402
ELSE
~ D=2; ~  } 404

FIG. 4

```
IF (A==B) THEN
    ~
702 —✓  ADDRESS REGISTER 306=ADDRESS OF "C";
    ~
  ELSE
    ~
704 —✓  ADDRESS REGISTER 306=ADDRESS OF "D";
    ~
706 —✓  VALUE REGISTER 308=LOAD[ADDRESS REGISTER 306];

IF (A==B) THEN
    ~
708 —✓  Rc=10;
710 —✓  Rs1=[VALUE REGISTER 308]+[Rc];
    ~
  ELSE
    ~
712 —✓  Rd=20;
714 —✓  Rs2=[VALUE REGISTER 308]+[Rd];
    ~
```

FIG. 7

```
    IF (A==B) THEN
        ~
        C=1;
602 {   Z=C+10;
        ~
    ELSE
        ~
        D=2;
604 {   Y=D+20;
        ~
```

FIG. 6

COMPILER OPTIMIZATION THROUGH COMBINING OF MEMORY OPERATIONS

FIELD

The present invention relates to compiler optimization and, in particular, to optimization for the combining of memory operations.

BACKGROUND

In general, computer programmers write computer code as a source program in a high-level computer programming language and compile this high level code into executable code for running on a computer. The type of computer programming languages used to write the computer code may vary from procedural code type languages to object oriented languages. Due to the need to have faster applications which require less space, different optimization techniques for source code compilation of these applications have been developed.

Absent compiler optimization, for a typical memory operation, the assembly code generated by a compiler uses a general purpose register for holding the address of the memory location being modified, as well as a general purpose register for holding the value to be assigned to the memory location for each path.

Currently, one technique of compiler optimization is the combining of memory operations (e.g., load and store operations) for those variables that are the same but are located in mutually exclusive memory operation blocks (e.g., if-else statements). For example, FIG. 1 illustrates a portion of a source program that includes mutually exclusive memory operation blocks. In particular, FIG. 1 is an "if-else" statement that includes memory operation block 102 and memory operation block 104 that are part of the "if" statement and "else" statement, respectively. Memory operation block 102 includes the memory operation of assigning a value of one to the variable "Z." Similarly, memory operation block 104 includes the memory operation of assigning a value of two to the same variable "Z."

FIG. 2 illustrates a set of pseudo assembly code instructions (i.e., an executable program) outputted from a compiler after this compilation technique of the portion of the source program illustrated in FIG. 1. These assembly code instructions are then typically translated into executable code, as is well known in the art. In particular, FIG. 2 is a set of pseudo assembly code instructions, which includes first instruction 202 and second instruction 204 that are generated for the memory operation in memory operation block 102. Similarly, third instruction 206 and fourth instruction 208 are generated for the memory operation in memory operation block 104. Additionally fifth instruction 210 is generated for both memory operation block 102 and memory operation block 104.

Instruction 202 assigns the memory address of the variable "Z" to address register $R_a$, and instruction 204 assigns a value of one to value register $R_v$. Similarly, instruction 206 assigns the memory address of the same variable "Z" into the same address register $R_a$. Instruction 208 assigns a value of two to the same value register $R_v$. Moreover, instruction 210 stores the value in value register $R_v$ into the memory address in address register $R_a$. This technique provides for the combining of memory operations for same memory address. Therefore, the value to be stored into the memory address located in address register $R_a$ is decided at execution time. In particular, if during execution, the "if" is executed, the value will be one. Conversely, if during execution, the "else" is executed, the value will be two. However, this optimization technique is limited to those memory addresses that are the same. Therefore, for these and other reasons there is a need for the present invention.

SUMMARY

In one embodiment, a method for compiling includes receiving a source program having a number of memory operation blocks that are mutually exclusive. Each of the memory operation blocks have a memory operation, such that the memory operation in each block is associated with a different memory address. Additionally, an executable program is generated based on the source program. The executable program includes an executable program section for each memory operation block of the source program such that each executable program section utilizes a same number of registers for each memory operation within each memory operation block.

BRIEF DESCRIPTION OF THE DRAWINGS

FIG. 1 is a source program that demonstrates the prior art.

FIG. 2 is a set of pseudo assembly code instructions that demonstrates the prior art.

FIG. 4 is a source program in accordance with an embodiment of the invention.

FIG. 5 is a set of pseudo assembly code instructions in accordance with an embodiment of the invention.

FIG. 6 is a source program in accordance with another embodiment of the invention.

FIG. 7 is a set of pseudo assembly code instructions in accordance with another embodiment of the invention.

DETAILED DESCRIPTION

The invention includes systems, methods, computers, and computer-readable media of varying scope. Besides the embodiments, advantages and aspects of the invention described here, the invention also includes other embodiments, advantages and aspects, as will become apparent by reading and studying the drawings and the following description.

In the following detailed description of the exemplary embodiments, reference is made to the accompanying drawings that form a part hereof, and in which are shown by way of illustration specific embodiments in which the invention may be practiced. It is to be understood that other embodiments may be utilized and structural changes may be made without departing from the scope of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 3:
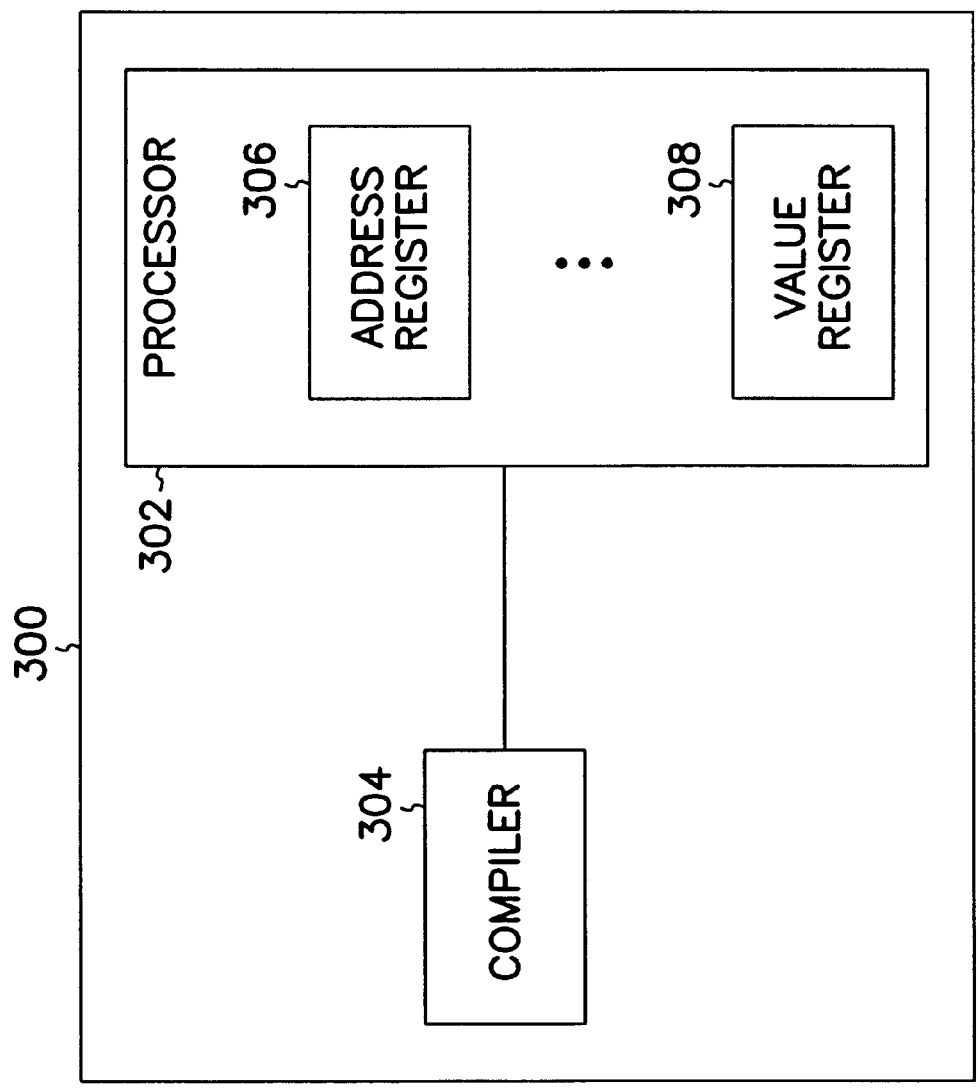
FIG. 3 is a block diagram of a system in accordance with an embodiment of the invention.

Referring first to FIG. 3, a block diagram of a system according to one embodiment of the invention is shown. In particular, FIG. 3 is a block diagram of system 300 which includes processor 302, compiler 304, address register 306 and value register 308. In one embodiment, compiler 304 is a computer program on a computer (i.e., a compiler program) that resides on a secondary storage medium (e.g., a hard drive on a computer) and is executed on processor 302. Additionally, in another embodiment, system 300 is a computer. Those of ordinary skill in the art will appreciate that system 300 may also include other components, not shown in FIG. 3; only those parts necessary to describe the invention in an enabling manner are provided.

Processor 302 has a number of registers including address register 306 and value register 308. Compiler 304 is a compiler that executes in processor 302 in which a source program is inputted, thereby causing compiler 304 to generate an executable program, as is well-known in the art. It important to appreciate that the embodiments of the present invention are not limited to any particular type of source program, as the type of computer programming languages used to write the source program may vary from procedural code type languages to object oriented languages. In one embodiment, the executable program is a set of assembly code instructions, as is well-known in the art. The source program includes a number of memory operation blocks that are mutually exclusive from one another. In other words, only one of the number of memory operation blocks will be executed by the processor during execution of the program.

One embodiment of a portion of a source program having memory operation blocks that are mutually exclusive is illustrated in FIG. 4. In particular, FIG. 4 illustrates embodiments of the present invention during a store operation in which a value is stored in memory from a register of processor 302. In FIG. 4, the portion of the source program having memory operations that are mutually exclusive is an "if-else" statement, as is well-known in the art. Embodiments of the present invention, however, are not so limited, as embodiments of the present invention may be applied to any type of mutually exclusive memory operation blocks. Additionally, each of the memory operation blocks include a memory operation such that each memory operation is associated with a different memory address.

In FIG. 4, the "if-else" statement includes memory operation block 402 and memory operation block 404 that are part of the "if" statement and "else" statement, respectively. Memory operation block 402 includes the memory operation of assigning a value of one to the variable "C." Similarly, memory operation block 404 includes the memory operation of assigning a value of two to the variable "D" such that the variables "C" and "D" are associated with different memory addresses.

Compiler 304 receives the portion of the source program illustrated in FIG. 4 and generates an executable program as illustrated in FIG. 5. FIG. 5 is a set of pseudo assembly code instructions that includes an "if-else" statement, which includes first store instruction 502, third store instruction 504, second store instruction 506, fourth store instruction 508 and fifth store instruction 510. In particular, compiler 304 generates the assembly code instructions of FIG. 5 such that first store instruction 502 and third store instruction 504 correspond to memory operation block 402. First store instruction 502 assigns the memory address of the variable "C" to address register 306, while third store instruction 504 assigns a value of one to value register 308.

Moreover, compiler 304 generates second store instruction 506 and fourth store instruction 508 to correspond to memory operation block 404. Second store instruction 506 assigns the memory address of the variable "D" to address register 306, while fourth store instruction 508 assigns a value of two to value register 308. Additionally, compiler 304 generates fifth store instruction 510 which corresponds to both memory operation block 402 and memory operation block 404. In particular, fifth store instruction 510 assigns the value placed into value register 308 into the address placed in address register 306. Therefore, the value to be stored in value register 308 is determined at the time the program is executed (i.e., run-time), depending on which of the two mutually exclusive memory operation blocks are executed. If the "if" is executed, value register 308 will contain the value stored at the memory address for the variable "C" (i.e., one) In contrast, if the "else" is executed, value register 308 will contain the value stored at the memory address for variable "D" (i.e., two). Advantageously, this optimizes the store operation by reducing the amount of memory traffic. Additionally, this embodiment, reduces the amount of assembly code instructions and removes scheduling hazards generally associated with memory instruction execution.

Another embodiment of a portion of a source program having memory operation blocks that are mutually exclusive is illustrated in FIG. 6. In particular, FIG. 6 illustrates embodiments of the present invention during a load operation in which a value from a memory address is loaded into a register of processor 302. In FIG. 6, the portion of the source program is an "if-else" statement, as is well-known in the art. As previously discussed, embodiments of the present invention, however, are not so limited, as embodiments of the present invention may be applied to any type of mutually exclusive memory operation blocks.

In FIG. 6, the "if-else" statement includes memory operation block 602 and memory operation block 604 that are part of the "if" statement and "else" statement, respectively. Memory operation block 602 includes the memory operation of assigning a value of one to the variable "C" as well as using the variable "C" during a subsequent operation (e.g., assignment of the value of "C" plus 10 to the variable "Z"). Similarly, memory operation block 604 includes the memory operation of assigning a value of two to the variable "D" as well as using the variable "D" during a subsequent operation (e.g., assignment of the value of "D" plus 20 to the variable "Y"), such that the variables "C" and "D" are associated with different memory addresses.

Compiler 304 receives the portion of the source program illustrated in FIG. 6 and generates an executable program, as illustrated in FIG. 7. FIG. 7 is a set of pseudo assembly code instructions that includes first load instruction 702, second load instruction 704, third load instruction 706, fourth load instruction 708, fifth load instruction 710, sixth load instruction 712 and seventh load instruction 714. In particular, first load instruction 702 assigns the memory address of the variable "C" to address register 306. Second load instruction 704 assigns the memory address of the variable "D" to the same register, address register 306. Third load instruction 706 loads the value stored at the memory address located in address register 306 into value register 308. Therefore, the value to be stored in value register 308 is determined at the time the program is executed (i.e., run-time), depending on which of the two mutually exclusive memory operation blocks are executed. If the "if" is executed, value register 308 will contain the value stored at the memory address for the variable "C." In contrast, if the "else" is executed, value register 308 will contain the value stored at the memory address for variable "D."

Moreover, instructions are written to allow the use of the value located in value register 308. In particular, fourth load instruction 708 and fifth load above are executed, thereby using the value of "C" located in value register 308. Fourth load instruction 708 assigns a value of 10 to another register, $R_c$. Additionally, fifth load instruction 710 uses value register 308 by adding its contents to the value of the contents of register $R_c$ (i.e., 10) into another register, $R_{s1}$.

Moreover, sixth load instruction 712 and seventh load instruction 714 are executed if memory operations of the "else" statement above are executed, thereby using the value of "D" located in value register 308. Sixth load instruction 712 assigns a value of 20 to another register, $R_d$. Additionally, seventh load instruction 714 uses value register 308 by adding its contents to the value of the contents of register $R_d$ (i.e., 20) into another register, $R_{s2}$. Therefore, if the "if" is executed, register $R_{s1}$ has the value of eleven, as value register 308 has the value of ten. In contrast, if the "else" is executed, register $R_{s2}$ has the value of twenty-two, as value register 308 has the value of twenty. In other words, the value in value register 308 is determined at the time of execution (i.e., run-time). Advantageously, this optimizes the load operation by reducing the amount of memory traffic. Additionally, this embodiment, reduces the amount of assembly code instructions and removes scheduling hazards generally associated with memory instruction execution.

Figure 8:
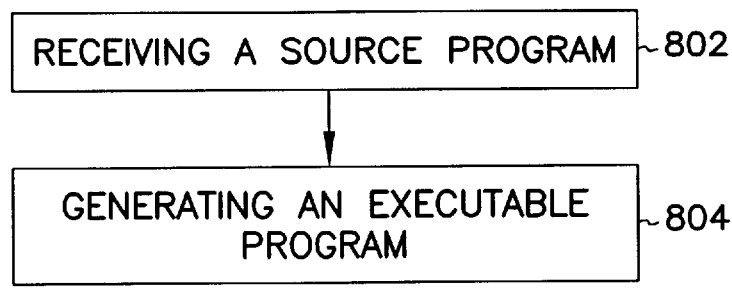
FIGS. 8–10 are flowcharts of methods in accordance with embodiments of the present invention.
Figure 9:
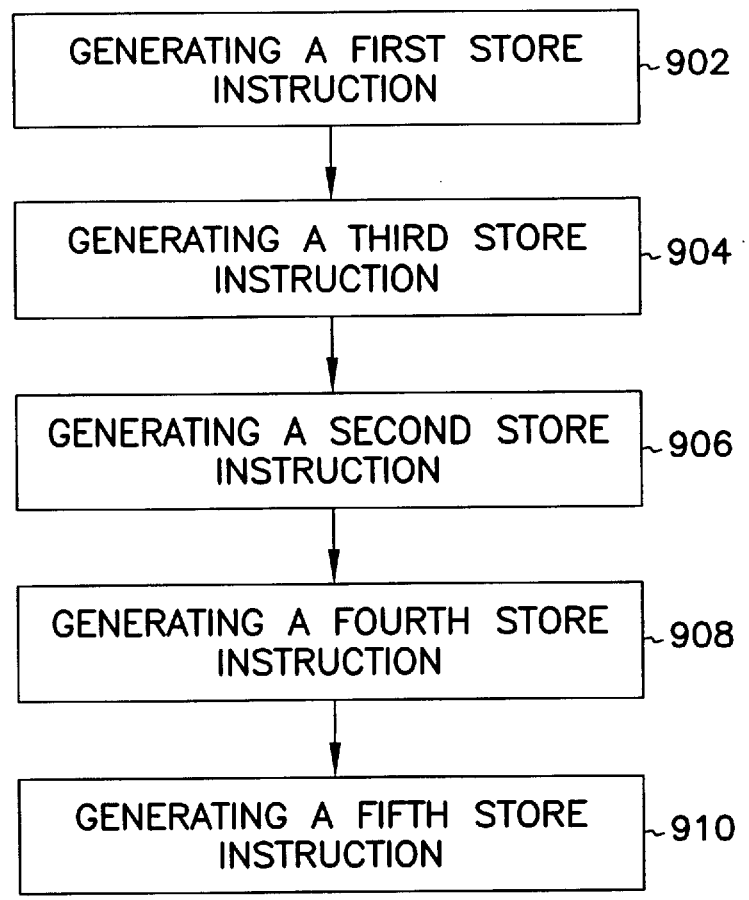
Figure 10:
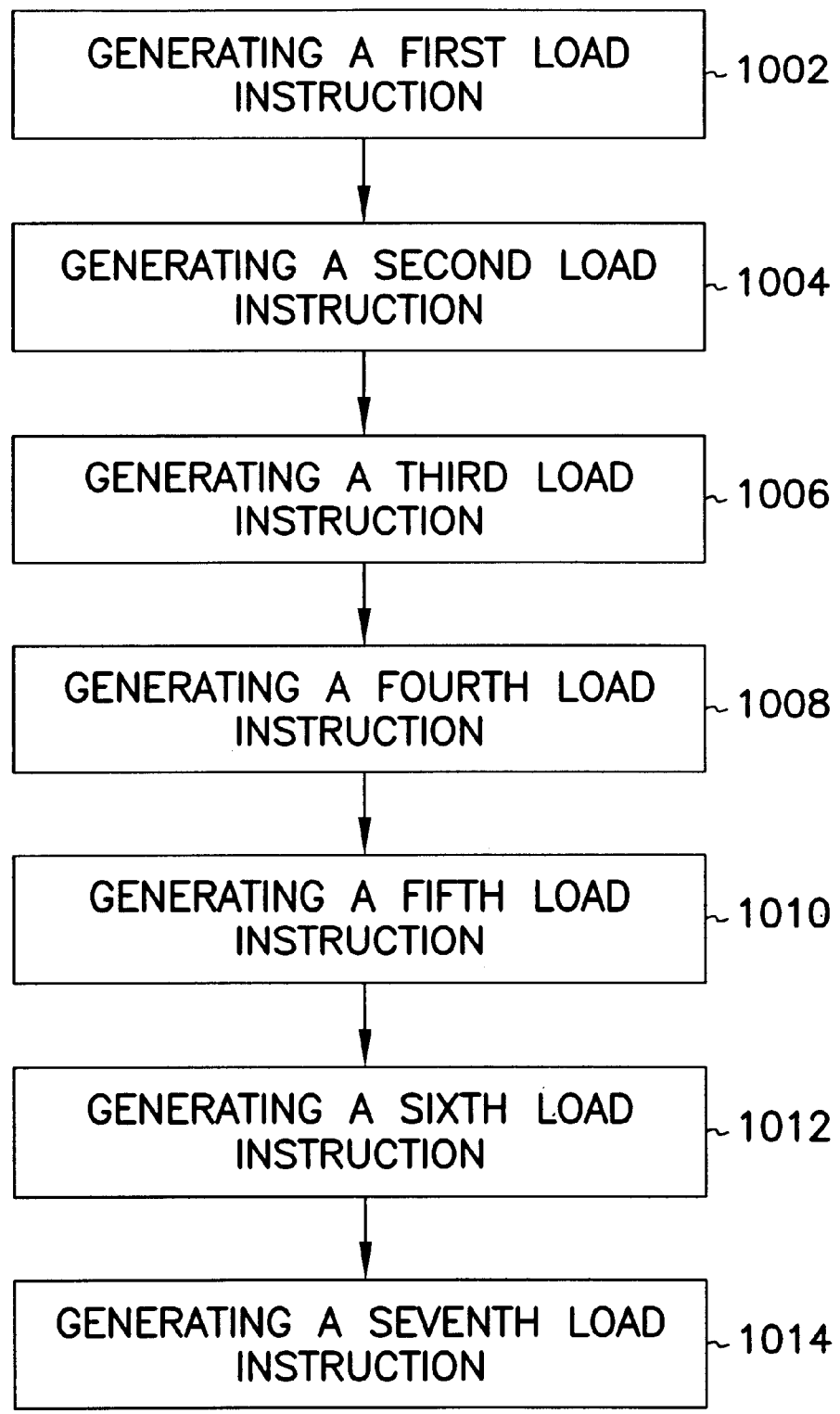

Referring next to FIGS. 8–10, flowcharts of methods in accordance with embodiments of the invention is shown. The methods are typically realized at least in part as one or more programs running on a computer—that is, as a program executed from a computer-readable medium such as a memory by a processor of a computer. The programs are typically storable on a computer-readable medium such as a floppy disk, a Compact Disk-Read Only Memory (CD-ROM), for distribution and installation and execution on another (suitably equipped) computer.

Referring first to FIG. 8, in block 802, compiler 304 receives a source program. The source program includes a number of memory operation blocks that are mutually exclusive from one another. In other words, only one of the number of memory operation blocks will be executed by the processor during execution of the program (e.g., an "if-else" statement). Additionally, each of the memory operation blocks include a memory operation such that each memory operation is associated with a different memory address.

In block 804, compiler 304 generates an executable program based on the source program. In one embodiment, the executable program is a set of assembly code instructions. Moreover, the executable program includes an executable program section for each memory operation block of the source program. Each executable program section uses the same registers of processor 302 for each memory operation within each memory operation block. Therefore, the executable program (i.e., the compiled code) is optimized by having a same set of registers associated with different memory addresses such that the content of the set of registers is determined at the time of execution (i.e., run-time). As previously described, advantageously this optimizes execution of the program by reducing the amount of memory traffic. Additionally, this reduces the amount of assembly code instructions and removes scheduling hazards generally associated with memory instruction execution.

Referring next to FIG. 9, a flowchart of an embodiment of the generation of the executable program of block 804 is shown. FIGS. 4 and 5 will be used to illustrate the flowchart of FIG. 9. As previously described, FIG. 4 illustrates an embodiment of a portion of a source program having memory operation blocks that are mutually exclusive. In particular, FIG. 4 includes a portion of a source program during a store operation in which a value is stored in memory from a register of processor 302.

In FIG. 4, the "if-else" statement includes memory operation block 402 and memory operation block 404 that are part of the "if" statement and "else" statement, respectively. Memory operation block 402 includes the memory operation of assigning a value of one to the variable "C." Similarly, memory operation block 404 includes the memory operation of assigning a value of two to the variable "D" such that the variables "C" and "D" are associated with different memory addresses.

Compiler 304 generates the set of pseudo assembly code instructions of FIG. 5. In block 902, compiler 304 generates first store instruction 502 that assigns the memory address of the variable "C" to address register 306. In block 904, compiler 304 generates third store instruction 504 that assigns a value of one to value register 308. Continuing to block 906, compiler 304 generates second store instruction 506 that assigns the memory address of the variable "D" to address register 306. In block 908, compiler 304 generates fourth store instruction 508 that assigns a value of two to value register 308.

Additionally in block 910, compiler 304 generates fifth store instruction 510 that assigns the value placed into value register 308 into the memory address placed in address register 306. Therefore, the value to be stored in value register 308 is determined at the time the program is executed (i.e., run-time), depending on which of the two mutually exclusive memory operation blocks are executed. If the "if" is executed, value register 308 will contain the value stored at the memory address for the variable "C" (i.e., one) In contrast, if the "else" is executed, value register 308 will contain the value stored at the memory address for variable "D" (i.e., two).

Referring next to FIG. 10, a flowchart of another embodiment of the generation of the executable program of block 804 is shown. FIGS. 6 and 7 will be used to illustrate the flowchart of FIG. 10. As previously described, FIG. 6 illustrates an embodiment of a portion of a source program having memory operation blocks that are mutually exclusive. In particular, FIG. 6 includes a portion of a source program during a load operation in which a value from a memory address is loaded into a register of processor 302.

Compiler 304 generates the set of pseudo assembly code instructions of FIG. 7. In block 1002, compiler 304 generates first load instruction 702 that assigns the memory address of the variable "C" to address register 306. In block 1004, compiler 304 generates second load instruction 704 that assigns the memory address of variable "D" to the same register, address register 306. Continuing to block 1006, compiler 304 generates third load instruction 706 that loads the value stored at the memory address located in address register 306 into value register 308. Therefore, the value to be stored in value register 308 is determined at the time the program is executed (i.e., run-time), depending on which of the two mutually exclusive memory operation blocks are executed. If the "if" is executed, value register 308 will contain the value stored at the memory address for the variable "C." In contrast, if the "else" is executed, value register 308 will contain the value stored at the memory address for variable "D."

Moreover, compiler 304 generates additional instructions to use the value located in value register 308. In particular, fourth load instruction 708 and fifth load instruction 710 are generated by compiler 304 to be executed if the memory operations associated with the "if" statement above are executed, thereby using the value of "C" located in value register 308. In block 1008, compiler 304 generates fourth load instruction 708 that assigns a value of 10 to another register, $R_c$. In block 1010, compiler 304 generates fifth load instruction 710 that uses value register 308 by adding its contents to the value of the contents of register $R_c$ (i.e., 10) into another register, $R_{s1}$.

Moreover, compiler 304 generates additional instructions to be executed if the memory operations associated with the "else" statement above are executed, thereby using the value of "D" located in value register 308. In particular, in block 1012, compiler 304 generates sixth load instruction 712 that assigns a value of 20 to another register, $R_d$. In block 1014, compiler 304 generates seventh load instruction 714 that uses value register 308 by adding its contents to the value of the contents of register $R_d$ (i.e., 20) into another register, $R_{s2}$. Therefore, if the "if" is executed, register $R_{s1}$ has the value of eleven, as value register 308 has the value of ten. In contrast, if the "else" is executed, register $R_{s2}$ has the value of twenty-two, as value register 308 has the value of twenty. In other words, the value in value register 308 is determined at the time of execution (i.e., run-time).

Figure 11:
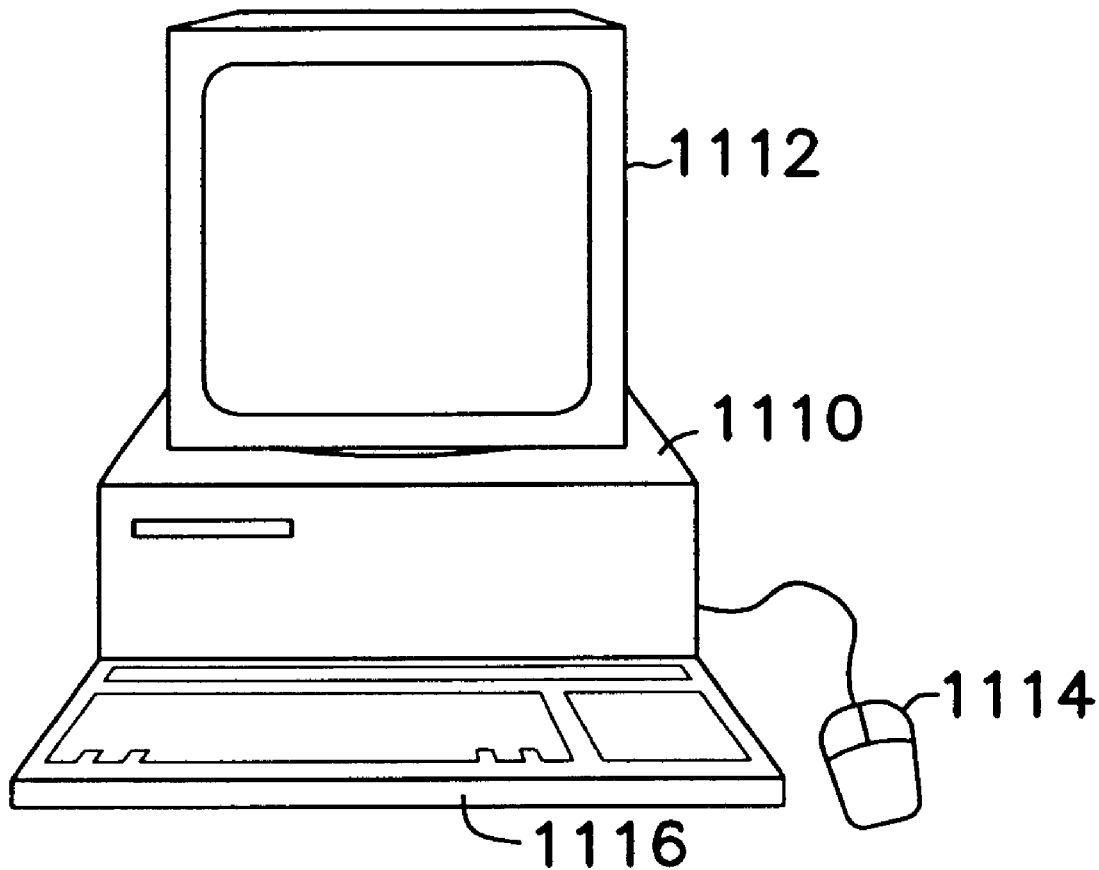
FIG. 11 is a diagram of a computer in conjunction with which embodiment of the invention may be practiced.

Referring finally to FIG. 11, a diagram of a representative computer in conjunction with which embodiments of the invention may be practiced is shown. It is noted that embodiments of the invention may be practiced on other electronic devices including but not limited to a set-top box connected to the Internet. Computer 1110 is operatively coupled to monitor 1112 and pointing device 1114. Computer 1110 includes a processor (typically, one of a number of Intel® Pentium® processors), random-access memory (RAM), read-only memory (ROM), and one or more storage devices, such as a hard disk drive, a floppy disk drive (into which a floppy disk can be inserted), an optical disk drive, and a tape cartridge drive. The memory, hard drives, floppy disks, etc., are types of computer-readable media. The invention is not particularly limited to any type of computer 410. In one embodiment, computer 1110 is a PC-compatible computer, running a version of the Microsoft® Windows® operating system. Residing on computer 1110 is a computer readable medium storing a computer program which is executed on computer 1110. Compiler optimization is performed by the computer program is in accordance with an embodiment of the invention.

The above description illustrate embodiments of the present invention that include only two memory operation blocks. However, embodiments of the present invention are not so limited, as source programs having more than two memory operation blocks can also be optimized under embodiments of the present invention (e.g., "if-else if-else" statement). Moreover, the above description illustrate embodiments of the present invention that include only one memory operation within a particular memory block. However, embodiments of the present invention are not so limited, as source programs having more than one memory operation can also be optimized under embodiments of the present invention.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is manifestly intended that this invention be limited only by the following claims and equivalents thereof.

I claim:

1. A method for compiling comprising:

receiving a source program having a plurality of memory operation blocks that are mutually exclusive, each of the memory operation blocks having a memory operation, such that the memory operation in each block is associated with a different memory address; and generating an executable program based on the source program, including an executable program section for each memory operation block of the source program such that each executable program section utilizes a same plurality of registers for each memory operation within each memory operation block.

2. The method of claim 1, wherein generating the executable program based on the source program comprises:

generating a first store instruction for a first block of the plurality of memory operation blocks such that the first store instruction is capable of loading a first address of a first memory location into an address register of the plurality of registers, and generating a second store instruction for a second block of the plurality of memory operation block such that the second store instruction is capable of loading a second address of a second memory location into the address register.

3. The method of claim 2, wherein generating the executable program based on the source program further comprises:

generating a third store instruction for the first block such that the third store instruction is capable of loading a first value to be assigned to the first memory location into a value register of the plurality of registers, and generating a fourth store instruction for the second block such that the fourth store instruction is capable of loading a second value to be assigned to the second memory location into the value register.

4. The method of claim 3, wherein generating the executable program based on the source program further comprises generating a fifth store instruction capable of storing a value to be assigned to the value register into an address of a memory location to be assigned to the address register.

5. The method of claim 1, wherein generating the executable program based on the source program comprises:

generating a first load instruction for a first block of the plurality of memory operation blocks such that the first load instruction is capable of loading a first address of a first memory location into an address register of the plurality of registers, and generating a second load instruction for a second block of the plurality of memory operation block such that the second load instruction is capable of loading a second address of a second memory location into the address register.

6. The method of claim 5, wherein generating the executable program based on the source program further comprises generating a third load instruction capable of loading a value assigned to the address register into a value register.

7. A system for compiling comprising:

a source program having a plurality of memory operation blocks that are mutually exclusive, each of the memory operation blocks having a memory operation, such that the memory operation in each block is associated with a different memory address; and a compiler which inputs the source program and generates an executable program, including an executable program section for each memory operation block of the source program such that each executable program section utilizes a same plurality of registers for each memory operation within each memory operation block.

8. The system of claim 7, wherein the executable program section for each memory operation block comprises:

a first store instruction for a first block of the plurality of memory operation blocks such that the first store instruction is capable of loading a first address of a first memory location into an address register of the plurality of registers, and a second store instruction for a second block of the plurality of blocks such that the second store instruction is capable of loading a second address of a second memory location into the address register.

9. The system of claim 8, wherein the executable program section for each memory operation block further comprises:

a third store instruction for the first block such that the third store instruction is capable of loading a first value to be assigned to the first memory location into a value register of the plurality of registers, and a fourth store instruction for the second block such that the fourth store instruction is capable of loading a second value to be assigned to the second memory location into the value register.

10. The system of claim 9, wherein the executable program further comprises a fifth store instruction capable of storing a value to be assigned to the value register into an address of a memory location to be assigned to the address register.

11. The system of claim 7, wherein the executable program section for each memory operation block comprises:

a first load instruction for a first block of the plurality of memory operation blocks such that the first load instruction is capable of loading a first address of a first memory location into an address register of the plurality of registers, and a second load instruction for a second block of the plurality of blocks such that the second load instruction is capable of loading a second address of a second memory location into the address register.

12. The system of claim 11, wherein the executable program further comprises a third load instruction capable of loading a value assigned to the address register into a value register.

13. A system for compiling comprising:

a processor having a plurality of registers; and a compiler executing in the processor which inputs a source program having a plurality of memory operation blocks that are mutually exclusive, each of the memory operation blocks having a memory operation, such that the memory operation in each block is associated with a different memory address, wherein the compiler generates an executable program based on the source program, including an executable program section for each memory operation block of the source program such that each executable program section utilizes a same plurality of registers for the memory operation within each memory operation block.

14. The system of claim 13, wherein the executable program section for each memory operation block comprises:

a first store instruction for a first block of the plurality of memory operation blocks such that the first store instruction is capable of loading a first address of a first memory location into an address register of the plurality of registers, and a second store instruction for a second block of the plurality of memory operation blocks such that the second store instruction is capable of loading a second address of a second memory location into the address register.

15. The system of claim 14, wherein the executable program section for each memory operation block further comprises:

a third store instruction for the first block such that the third store instruction is capable of loading a first value to be assigned to the first memory location into a value register of the plurality of registers, and a fourth store instruction for the second block such that the fourth store instruction is capable of loading a second value to be assigned to the second variable into the value register.

16. The system of claim 13, wherein the executable program further comprises a fifth store instruction capable of storing a value to be assigned to the value register into an address of a memory location to be assigned to the address register.

17. The system of claim 13, wherein the executable program section for each memory operation block comprises:

a first load instruction for a first block of the plurality of memory operation blocks such that the first load instruction is capable of loading a first address of a first memory location into an address register of the plurality of registers, and a second load instruction for a second block of the plurality of memory operation blocks such that the second load instruction is capable of loading a second address of a second memory location into the address register.

18. The system of claim 17, wherein the executable program further comprises a third load instruction capable of loading a value assigned to the address register into a value register.

19. A computer-readable medium having computer-executable instructions for performing a method comprising:

receiving a source program having a plurality of memory operation blocks that are mutually exclusive, each of the memory operation blocks having a memory operation, such that the memory operation in each block is associated with a different memory address; and generating an executable program based on the source program, including an executable program section for each memory operation block of the source program such that each executable program section utilizes a same plurality of registers for each memory operation within each memory operation block.

20. The computer-readable medium of claim 19, wherein generating the executable program based on the source program comprises:

generating a first store instruction for a first block of the plurality of memory operation blocks such that the first store instruction is capable of loading a first address of a first memory location into an address register of the plurality of registers, and generating a second store instruction for a second block of the plurality of memory operation block such that the second store instruction is capable of loading a second address of a second memory location into the address register.

21. The computer-readable medium of claim 20, wherein generating the executable program based on the source program further comprises:

generating a third store instruction for the first block such that the third store instruction is capable of loading a first value to be assigned to the first memory location into a value register of the plurality of registers, and generating a fourth store instruction for the second block such that the fourth store instruction is capable of loading a second value to be assigned to the second memory location into the value register.

22. The computer-readable medium of claim 21, wherein generating the executable program based on the source program further comprises generating a fifth store instruction capable of storing a value to be assigned to the value register into an address of a memory location to be assigned to the address register.

23. The computer-readable medium of claim 19, wherein generating the executable program based on the source program comprises:

generating a first load instruction for a first block of the plurality of memory operation blocks such that the first load executable instruction is capable of loading a first address of a first memory location into an address register of the plurality of registers, and generating a second load instruction for a second block of the plurality of memory operation block such that the second load executable instruction is capable of loading a second address of a second memory location into the address register.

24. The computer-readable medium of claim 23, wherein generating the executable program based on the source program further comprises generating a third load instruction capable of loading a value assigned to the address register into a value register.

* * * * *

UNITED STATES PATENT AND TRADEMARK OFFICE
CERTIFICATE OF CORRECTION

PATENT NO. : 6,351,849 B1
DATED : February 26, 2002
INVENTOR(S) : William Y. Chen It is certified that error appears in the above-identified patent and that said Letters Patent is hereby corrected as shown below:

<u>Column 7,</u>
Line 57, delete "arc" and insert -- are --, therefor.

Signed and Sealed this

Ninth Day of July, 2002

Attest:

JAMES E. ROGAN
Attesting Officer      Director of the United States Patent and Trademark Office